United States Patent [19]

McDougall

[11] 3,807,041

[45] Apr. 30, 1974

[54] METHOD OF FABRICATING A COMPOSITE SUPERCONDUCTOR

[75] Inventor: Ian Leitch McDougall, Aldridge, England

[73] Assignee: Imperial Metal Industries (Kynoch) Limited, Birmingham, England

[22] Filed: Nov. 21, 1972

[21] Appl. No.: 308,338

[30] Foreign Application Priority Data

Dec. 22, 1971 Great Britain.................59496/71

[52] U.S. Cl.......... 29/599, 174/126 CP, 174/DIG. 6
[51] Int. Cl............................................ H01v 11/14
[58] Field of Search ..... 29/599, 470.9; 174/126 CP, 174/DIG. 6; 335/216

[56] References Cited
UNITED STATES PATENTS

| | | | |
|---|---|---|---|
| 3,574,573 | 4/1971 | Tachikawa et al................. | 29/599 X |
| 3,728,165 | 4/1973 | Howlett ............................. | 29/599 X |
| 3,638,298 | 2/1972 | Sinizer et al....................... | 29/470.9 |
| 3,737,824 | 6/1973 | Coles................................. | 29/599 X |

FOREIGN PATENTS OR APPLICATIONS 1,039,316  8/1966  Great Britain........................ 29/599

*Primary Examiner*—Charles W. Lanham
*Assistant Examiner*—D. C. Reiley, III
*Attorney, Agent, or Firm*—Cushman, Darby & Cushman

[57] ABSTRACT

A method of coating a superconductor precursor prior to reaction of the components of the superconductor which comprises coating the precursor with a material having a low self-diffusion coefficient prior to the reaction.

16 Claims, No Drawings

METHOD OF FABRICATING A COMPOSITE SUPERCONDUCTOR

BACKGROUND OF THE INVENTION

This invention relates to superconductors, and method of manufacture thereof. This invention is or may be cognate with our co-pending U.S. Pat. application Ser. No. 220,057, filed Jan. 24, 1972.

The present invention provides a method of manufacturing a superconductor comprising a superconductive intermetallic compound of at least two elements which includes the steps of producing a composite precursor comprising at least one filament of at least one of the elements, the at least one filament being embedded in a matrix material comprising a support material and the remainder of the elements, coating the precursor with a material having a low self-diffusion coefficient and insoluble in the matrix material, diffusing the remainder of the elements into the filament and reacting the elements together to form the intermetallic compound.

The precursor may be spooled on to a former prior to the diffusion step.

Preferably the material is removed from the precursor after the reaction.

The material may be carbon and may be coated on to the precursor by coating the precursor with a compound decomposable in an inert atmosphere to form carbon, and heating the precursor to decompose the compound to form the carbon in situ on the precursor. The compound preferably contains an excess of hydrogen. The compound may be polyvinyl acetate. The compound may be lanolin and the lanolin-coated precursor may subsequently be coated with a finely powdered refractory compound which may be alumino silicate. The superconductive intermetallic compound may be $Nb_3Sn$, and the support material may be copper, or silver.

The material may be magnesium oxide, and may be coated on to the precursor by coating the precursor with magnesium hydroxide, and heating the precursor to evolve water and form magnesium oxide in situ on the precursor. The magnesium hydroxide may be coated on to the precursor by dipping the precursor into a suspension of magnesium hydroxide.

The former may be a coil former, the coating being an insulant and the reacted coil being impregnated with a support medium after reaction. The coating material may be a mixture of lanolin and alumino silicate, the lanolin decomposing to form a carbon layer which is removed by oxidation prior to impregnation.

The material may be removed by brushing, and may be removed by passing the precursor between felt pads.

By way of example, the present invention will now be described with reference to the manufacture of the intermetallic superconductor compound $Nb_3Sn$. This compound is selected because of its good superconductive properties as regards critical temperature and current-carrying capacity in high magnetic fields, but the principles of the invention apply to other intermetallic superconductor compounds.

SUMMARY OF THE INVENTION

Accordingly there is manufactured a precursor comprising a plurality of niobium filaments embedded in a low tin bronze (approximately 2-6wt. percent tin). The precursor is made by co-processing niobium and low tin bronze as for example described in British Pat. Specifications 1178114, 1178115 and 1178116. By choosing a bronze having a 2-6wt percent tin, the mechanical properties, particularly the hardness, of the niobium and the bronze are compatible, and the composite may be readily co-processed.

The precursor is then provided with tin as the second element of the eventual superconductive intermetallic compound $Nb_3Sn$, by a technique in which the tin is coated in a number of layers on to the exterior surface of the bronze matrix. The bronze matrix is homogenised by inward diffusion of tin from the coating and the tin is then diffused into the niobium filaments. There is subsequently carried out a reaction between at least some of the niobium of the niobium filaments and the tin to produce $Nb_3Sn$.

The homogeneous matrix consists of a copper-tin alloy which is a bronze. Bronze intermetallic compounds of copper and tin are stable in the temperature range 230°–760°C for a bronze composition 18–99wt.% Sn, balance copper. However, it is desirable to avoid the formation of intermetallic copper-tin compounds because firstly they embrittle the bronze when randomly distributed therein, and secondly the niobium filaments may present surfaces suitable for heterogeneous nucleation of the compounds, whereupon there is the possibility that intermetallic compounds of niobium, copper and tin can form and thereby inhibit the subsequent formation of $Nb_3Sn$. To avoid these difficulties, the precursor which comprises 61 niobium filaments embedded in a copper wire having a diameter of 0.005 inch (0.125mm) is wound on to a silica spool, and is immersed in an aqueous solution of stannous chloride and sodium hydroxide for approximately 50–60 hours. A layer of tin is electrolessly plated onto the copper surface of the strands of the precursor due to the reduction by NaOH. The tin is plated out extremely evenly, and the thickness gradually builds up until it reaches a constant and substantially uniform thickness over the whole of the precursor's surface. For a precursor 0.005 inch in diameter (0.125mm) and a Nb:Cu ratio of 4:1, this produces an amount approximately equal to one wt.% Sn compared to the copper in the original matrix. The spool is then removed from the solution and is washed in distilled water and dried in air.

The spool is then heated for approximately 1 minute at a temperature in the range 700°–800°C and at that temperature the tin diffuses a small way into the bronze precursor for a distance sufficient to raise the surface melting point so that the next coating when diffused in, does not cause excessive surface melting. Some of the tin from the bronze also diffuses into the niobium and forms a thin skin of a niobium tin compound around the filaments of niobium. This skin is impervious to copper and prevents the copper diffusing into the niobium and subsequently contaminating the $Nb_3Sn$ which is eventually formed in the final heat treatment.

The spool of precursor is again put into an aqueous stannous chloride sodium hydroxide solution for 50 to 60 hours, washed, dried and further heat treated at 700°–800°C for one minute. Lower temperatures in the range 400°–700°C may be acceptable, or even preferable from a contamination point of view.

Up to five cycles are used starting with a 5wt.% Sn bronze, so that the final composition of the bronze is in the order of 10wt.% Sn. The precursor is then unwound from the spool, passed through a bath of molten polyvinyl acetate (pva), and through a die to remove the excess pva, as is normal in wire insulation. The pva is then allowed to harden and the precursor is then respooled on to a further silica spool, and is heated to 450°–800°C in an inert atmosphere, at which temperature the pva is decomposed to form carbon and gaseous products, which carbon is left adhering to the precursor, and insulates each of the strands from each other.

Pva has a general formula $(CH_3 \cdot COOCH:CH_2)_n$ and it can be seen that there is an excess of carbon and hydrogen over the amount of oxygen present, on heating, carbon dioxide, carbon monoxide and water are evolved, together with hydrogen, which acts as a reducing agent to prevent oxidation of the precursor. Also evolved is carbon which is deposited in situ on the precursor.

Alternatively, the precursor is passed through a bath containing magnesium hydroxide slurry. The precursor is then dried and heated. Steam is evolved and magnesium oxide is deposited on the precursor.

Both carbon and MgO have a very low self-diffusion coefficient, which prevents the layer bonding to itself in subsequent heating. Additionally, both carbon and MgO are almost completely insoluble in the metal of the precursor, which means that the eventual $Nb_3Sn$ filaments are not contaminated by the carbon or the MgO.

The respooled precursor is then heated to a temperature in the range 770°–820°C (the lower temperatures corresponding to a higher tin content) for 90 hours, so that the tin diffuses into the niobium, and forms $Nb_3Sn$. The niobium filaments are approximately 5 microns in diameter, and are almost entirely converted into $Nb_3Sn$.

It has been found that using a low tin bronze can have advantages over using pure copper as the starting point for the precursor, in that, as explained above, copper contamination of the niobium is reduced by the formation of the thin niobium tin compound around the niobium filaments. As the critical current falls off dramatically at higher fields with even quite low concentrations of copper in the $Nb_3Sn$, then this difference is very important.

It will be appreciated that the niobium filaments may be twisted initially so as to reduce flux degradation in the final product when in use.

Once the final heat treatment is completed, the conductor is unwound from the spool, the carbon or MgO deposits are removed by passing the wire through felt pads which brush off the non-adherent carbon deposit to give a final product.

The reacted conductor is normally wound into coils for use an an electromagnet. However, the property of non-attraction can be used, in certain cases to form a coil in a single operation. The coated precursor is wound into a coil and reacted, the insulant staying in position to prevent welding between the turns and also acting as an electrical insulant. This is only usable in cases where the diffusion barrier is also an electrical insulant. The coil is then impregnated to hold the turns in position.

One particular combination of material which has been found to be particularly suitable is a lanolin-/alumino silicate mixture. Lanolin is a solid grease-like material which melts to form a very fluid liquid which is solid at room temperature. The loosely spooled precursor can be located in a bath of molten lanolin and removed so that a layer of lanolin solid is positioned on the surface of the precursor. The wire is then coated with very fine alumino silicate powder by passing it through a heap of powder. When the coated wire is recoiled, the small powder particles physically separate the strands of the wire. On subsequent heat treatment, the particles again separate the wire as does the layer of carbon formed by oxidation of the lanolin during the heat treatment stage.

Although $Nb_3Sn$ has been used in the specific example, it will be appreciated that the method is applicable to other intermetallic systems prepared by the same general route, and which need to be heated whilst on a spool for a reaction to occur to form the compound.

I claim:

1. A method of manufacturing a composite superconductor having a superconductive intermetallic compound including at least two chemical elements, said method comprising the steps of producing a composite precursor which contains at least one filament of one of the chemical elements, the filament being embedded in a matrix material which comprises a support material and the remainder of the chemical elements, coating the precursor with a nonmetallic coating material which has a low self-diffusion coefficient and which is insoluble in the matrix material, spooling the coated precursor on to a former, and heating the spooled coated precursor to diffuse the remainder of the chemical elements into the filament and to react the chemical elements together to form the intermetallic compound, the coating material preventing welding together of the precursor windings.

2. A method as claimed in claim 1 in which the coating material is removed from the precursor after the reaction.

3. A method as claimed in claim 1 in which the coating material is carbon.

4. A method as claimed in claim 3 in which the carbon is coated on to the precursor by coating the precursor with a compound decomposable in an inert atmosphere to form carbon, and heating the precursor to decompose the compound and form the carbon in situ on the precursor.

5. A method as claimed in claim 4 in which the compound is polyvinyl acetate.

6. A method as claimed in claim 4 in which the compound is lanolin.

7. A method as claimed in claim 6 in which the lanolin coated precursor is subsequently coated with a finely powdered refractory compound.

8. A method as claimed in claim 7 in which the finely powdered refractory compound is alumino silicate.

9. A method as claimed in claim 1 in which the coating material is magnesium oxide.

10. A method as claimed in claim 9 in which the magnesium oxide is coated on to the precursor by coating the precursor with magnesium hydroxide and heating the precursor to evolve water and form magnesium oxide in situ on the precursor.

11. A method as claimed in claim 10 in which the magnesium hydroxide is coated on to the precursor by dipping the precursor into a suspension of magnesium hydroxide.

12. A method as claimed in claim 2 in which the coating material is removed by brushing or by passing the precursor between felt pads.

13. A method as claimed in claim 1 in which the former is a coil former, the coating material being an insulant and the reacted coil being impregnated with a support medium after reaction.

14. A method as claimed in claim 13 in which the coating material is a mixture of lanolin and alumino silicate, the lanolin decomposing to form a carbon layer which is removed by oxidation prior to impregnation.

15. A method as claimed in claim 1 in which the superconductive intermetallic compound is $Nb_3Sn$ and the support material is copper or silver.

16. A method as claimed in claim 1 in which the superconductive compound is $V_3Ga$, and the support material is copper or silver.

* * * * *